United States Patent
Bacherler et al.

(10) Patent No.: US 12,434,553 B2
(45) Date of Patent: Oct. 7, 2025

(54) OPERATING MEDIUM VESSEL FOR A VEHICLE AND VEHICLE HAVING AN OPERATING MEDIUM VESSEL

(71) Applicant: Bayerische Motoren Werke Aktiengesellschaft, Munich (DE)

(72) Inventors: Andreas Bacherler, Kaufbeuren (DE);
Raul Ramos Alonso, Schechen (DE);
Benjamin Schimpf, Winkelhaid (DE);
Michael Tarara, Vaterstetten (DE);
Batuhan Tugral, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/834,265

(22) PCT Filed: Jan. 31, 2023

(86) PCT No.: PCT/EP2023/052300
§ 371 (c)(1),
(2) Date: Jul. 30, 2024

(87) PCT Pub. No.: WO2023/144415
PCT Pub. Date: Aug. 3, 2023

(65) Prior Publication Data
US 2025/0135874 A1 May 1, 2025

(30) Foreign Application Priority Data
Jan. 31, 2022 (DE) .................. 10 2022 102 166.1

(51) Int. Cl.
*B60K 15/03* (2006.01)
*F02M 37/14* (2006.01)

(52) U.S. Cl.
CPC .... *B60K 15/03* (2013.01); *B60K 2015/03105* (2013.01); *B60K 2015/03111* (2013.01);
(Continued)

(58) Field of Classification Search
CPC ......... B60K 15/03; B60K 2015/03111; B60K 2015/03105; B60K 2015/03138;
(Continued)

(56) References Cited

U.S. PATENT DOCUMENTS

| 5,078,169 A | 1/1992 | Scheurenbrand et al. |
| 2003/0024577 A1 | 2/2003 | Eck et al. |

(Continued)

FOREIGN PATENT DOCUMENTS

| DE | 39 15 185 C1 | 10/1990 |
| DE | 195 04 217 A1 | 8/1996 |

(Continued)

OTHER PUBLICATIONS

Machine translation, DE19504217A1, Frank et al., obtained from https://worldwide.espacenet.com/, pp. 1-4.*

(Continued)

*Primary Examiner* — Grant Moubry
(74) *Attorney, Agent, or Firm* — Crowell & Moring LLP

(57) ABSTRACT

An operating medium vessel for a vehicle is provided for storing liquid operating medium and has: a withdrawal section with a reservoir pot arranged therein; a feed section which is connected fluid-conductively to the withdrawal section and is adjacent to the withdrawal section; and an operating medium delivery system with an operating medium reservoir arranged in the feed section, and with a first delivery device and a second delivery device. The first and the second delivery devices are each fluid-conductively connected to the operating medium reservoir. The first delivery device is designed to deliver operating medium out of the feed section from outside the operating medium reservoir into the operating medium reservoir, and the (Continued)

second delivery device is designed to deliver operating medium from the operating medium reservoir into the reservoir pot.

12 Claims, 4 Drawing Sheets

(52) U.S. Cl.
CPC ............... *B60K 2015/03138* (2013.01); *B60K 2015/0325* (2013.01)

(58) Field of Classification Search
CPC ........... B60K 2015/0325; F02M 37/14; F02M 37/10; F02M 37/00
See application file for complete search history.

(56) References Cited

U.S. PATENT DOCUMENTS

| 2004/0216783 | A1 | | 11/2004 | Rumpf | |
|---|---|---|---|---|---|
| 2008/0223865 | A1 | * | 9/2008 | Althof | B60K 15/077 220/749 |
| 2010/0122731 | A1 | * | 5/2010 | Bauer | B60K 15/00 137/625 |
| 2018/0304743 | A1 | | 10/2018 | Boecker et al. | |
| 2021/0102518 | A1 | * | 4/2021 | Völker | F02M 37/18 |
| 2024/0359815 | A1 | * | 10/2024 | Sandiford | B64D 37/32 |

FOREIGN PATENT DOCUMENTS

| DE | 102004007718 | A1 | * | 10/2005 | ............. B60K 15/03 |
|---|---|---|---|---|---|
| DE | 102009049799 | A1 | * | 4/2011 | ........... B60K 15/077 |
| DE | 102011011167 | A1 | * | 8/2012 | ........... B60K 15/061 |
| DE | 102013226291 | B4 | * | 10/2015 | ............. B60K 15/03 |
| DE | 10 2015 221 225 | A1 | | 5/2017 | |
| DE | 10 2016 220 625 | A1 | | 4/2018 | |
| DE | 10 2018 206 584 | A1 | | 10/2019 | |
| DE | 102020120492 | A1 | * | 2/2022 | |
| EP | 1 277 609 | A2 | | 1/2003 | |
| EP | 1 462 288 | A1 | | 9/2004 | |
| EP | 1484211 | A1 | * | 12/2004 | ........... B60K 15/077 |
| EP | 2628623 | A1 | * | 8/2013 | ........... B60K 15/077 |
| JP | 6-59117 | U | | 8/1994 | |

OTHER PUBLICATIONS

International Search Report (PCT/ISA/210) issued in PCT Application No. PCT/EP2023/052300 dated Apr. 25, 2023 with English translation (6 pages).

German-language Written Opinion (PCT/ISA/237) issued in PCT Application No. PCT/EP2023/052300 dated Apr. 25, 2023 with English translation (8 pages).

German-language Search Report issued in German Application No. 10 2022 102 166.1 dated Dec. 14, 2022 with partial English translation (12 pages).

\* cited by examiner

OPERATING MEDIUM VESSEL FOR A VEHICLE AND VEHICLE HAVING AN OPERATING MEDIUM VESSEL

BACKGROUND AND SUMMARY

The technology disclosed here relates to an operating medium vessel for a vehicle that is intended for storing liquid operating media, and also to a vehicle with an operating medium vessel of this kind.

In order to store a liquid operating medium, for example fuel, such as gasoline or diesel, in a vehicle (particularly an aircraft, land vehicle, or watercraft), it is known in the art for the vehicle to be provided with an operating medium vessel, in this example, in the form of a fuel tank. Gasoline filled into the fuel tank during refueling and subsequently stored in the fuel tank can be supplied to the vehicle's engine by means of a fuel pump and fuel lines.

A preferred object of the technology disclosed here is to reduce or eliminate at least one disadvantage of a solution known in the art or to propose an alternative solution. In particular, a preferred object of the technology disclosed here is to provide an operating medium vessel for a vehicle that can be manufactured comparatively cost-effectively and can be efficiently emptied to a relatively low residual amount of operating medium, even with a flat design. In addition, an object of the present technology is to provide a corresponding vehicle. Further preferred objects may arise from the advantageous effects of the technology disclosed here.

The object(s) is/are achieved by the subject matter of the independent claim(s). Preferred embodiments are presented in the dependent claims.

According to one aspect, an operating medium vessel is proposed here for storing liquid operating media (particularly under normal conditions). The operating medium vessel comprises a withdrawal section with a swirl pot arranged therein, a feed section connected in a fluid-conducting manner to the withdrawal section and adjacent to the withdrawal section, and an operating medium conveying system. The operating medium conveying system contains an operating medium reservoir arranged in the feed section, a first conveying device, and a second conveying device. The first and the second conveying device are each connected to the operating medium reservoir in a fluid-conducting manner. Furthermore, the first conveying device is configured to convey operating medium from the feed section from outside the operating medium reservoir into the operating medium reservoir. The second conveying device is configured to convey operating medium from the operating medium reservoir into the swirl pot.

The operating medium conveying system with the operating medium reservoir in the feed section allows the operating medium vessel to be constructed with a comparatively large base area, while still reliably maintaining the operating medium for further delivery into the swirl pot. Since the operating medium reservoir is arranged in the feed section, operating medium can be conveyed in an (energy-) efficient manner from the feed section in the vicinity of the operating medium reservoir into the reservoir by means of the first conveying device via a relatively short line. In addition, the first conveying device can be manufactured comparatively easily and cost-effectively. In particular, the number of conveying device (pumps) can be reduced. The operating medium vessel according to the technology disclosed here allows for a comparatively effective use of a small (residual) amount of operating medium in the operating medium vessel. Conversely, the initial filling amount of operating medium can be reduced.

The feed section preferably has a connecting section via which the feed section is connected to the withdrawal section in a fluid-conducting manner. In this case, a bottom of the operating medium vessel in the connecting section may have a threshold (elevation). The second conveying device is preferably configured to convey operating medium contained in the operating medium reservoir out of the operating medium reservoir, beyond the threshold, particularly into the swirl pot.

The bottom of the operating medium vessel in the withdrawal section preferably runs horizontally, particularly in a horizontal plane, when the operating medium vessel is located in its installed position. The threshold provided in the connecting section may be inclined in a ramp-like manner on a side opposite the withdrawal section and, in particular, an optional sump provided in the withdrawal section, as explained in greater detail below. The ramp may, in particular, lead from a low (first) level of the bottom of the operating medium vessel at an end of the connecting section opposite the withdrawal section to a higher (second) level of the bottom at an end of the connecting section facing the withdrawal section. This allows operating medium from the feed section, particularly when there is a low operating medium level below the high level, to flow over the ramp to the withdrawal section as a result of vehicle movements.

In the remaining feed section (outside the connecting section), the bottom of the operating medium vessel can also run horizontally, particularly when the operating medium vessel is in its installed position. In this remaining feed section, the bottom can therefore run substantially parallel to the part of the bottom of the operating medium vessel in the withdrawal section. In particular, the bottom of the operating medium vessel at a first end of the feed section, which is opposite the withdrawal section and where the operating medium vessel ends, can be arranged vertically at a lower level in the installed position of the operating medium vessel than at a second end adjacent to the withdrawal section.

In the context of the present disclosure, the term "installed position" can refer to the position of the operating medium vessel in its mounted state on the vehicle when the vehicle is horizontally aligned. When a horizontal alignment of the operating medium vessel is referred to below, it can mean the alignment of the operating medium vessel in the installed position. Unless otherwise indicated in the present disclosure, the described positional relationships, orientations, arrangements, and all other features particularly apply when the operating medium vessel is in its installed position. Conversely, the installed position can be defined independently of the vehicle by the fact that the bottom of the operating medium vessel runs horizontally in the withdrawal section. To this extent, all horizontally running parts of the operating medium vessel can, in this case, be regarded as (substantially) parallel to one another.

Similarly, the term "level." referring to the position in a vertical direction, preferably also relates to the operating medium vessel in its installed position. The term "height" can be understood as the vertical height in the installed position/perpendicular to the bottom of the operating medium vessel in the withdrawal section. Top/above and bottom/below can also refer to the installed position.

The bottom of the operating medium vessel can be the entire section of the wall of the operating medium vessel on which the hydrostatic pressure (gravitational pressure) of the operating medium vessel filled completely/to the brim (directly or indirectly via components provided inside the operating medium vessel) with operating medium rests in the installed position. In particular, the bottom of the operating medium vessel in the feed section may be the entire section of the wall of the operating medium vessel on which the hydrostatic pressure (gravitational pressure) of the feed section completely filled with operating medium rests in the installed position.

The bottom may contain a surface profile, particularly in the feed section, which comprises one or more elongated elevations/ribs and/or one or more channels. The surface profile is preferably configured in such a manner that operating medium located in the feed section (in the installed position) flows by gravity to one or more inlets of the first conveying device as the operating medium level drops, from which inlets the first conveying device can convey the operating medium into the operating medium reservoir. The one or more inlets are preferably located at local low points or depressions in the bottom in the region of the feed section.

The swirl pot and/or the operating medium reservoir may, in particular, be designed as surge pots. The swirl pot and/or the operating medium reservoir may each be used to store part of the operating medium contained in the operating medium vessel. The volume of the swirl pot or the operating medium reservoir is preferably very small compared with the storage volume of the operating medium vessel. For example, the volume of the swirl pot or the operating medium reservoir can be at least 10 times, preferably at least 50 times, and particularly preferably at least 100 times, smaller than the storage volume of the operating medium vessel. The swirl pot preferably stands on a support area which may be designed as pan of the bottom of the operating medium vessel in the withdrawal section. Similarly, the operating medium reservoir preferably stands on another support area in the feed section which may, in particular, be designed as part of the bottom of the operating medium vessel in the feed section.

The swirl pot may have an inlet (inflow) for the operating medium located in the immediate vicinity of the swirl pot in the withdrawal section, through which the operating medium can flow into the swirl pot. To prevent backflow in the opposite direction, the inlet may be equipped with a check valve, for example a mushroom valve or a valve flap. The swirl pot may also be part of a functional unit for withdrawing the operating medium from the withdrawal section. If the operating medium vessel is a fuel tank, for example, the functional unit can be designed as a tank installation unit. The functional unit can be inserted into the withdrawal section through a correspondingly dimensioned, sealable opening in the wall of the withdrawal section.

In addition to the swirl pot, the functional unit may have at least one conveying device connected to the swirl pot in a fluid-conducting manner via a delivery line for the operating medium located in the swirl pot, at least one filter medium for the operating medium, and/or at least one outlet. The conveying device can be configured to pressurize the operating medium from the swirl pot and/or to convey it through the delivery line(s) to the outlet or out of the functional unit. In a preferred variant, the conveying device is designed as a pump, in particular a submersible pump, within the swirl pot. The lowest/deepest level (fluid level) of the operating medium, from which the conveying device can convey the operating medium located in the swirl pot, is preferably arranged adjacent to the swirl pot bottom in the withdrawal section. The pump/conveying device may be designed as an active pump, in particular an electric pump.

The filter medium may be provided as a solid filter. The solid filter is configured to at least partially prevent solid particles contained in the operating medium from entering the swirl pot or the conveying device/pump. The solid filter is typically formed from a plurality of projecting elements extending from an outer surface of the swirl pot bottom. In this case, the individual projecting elements are arranged at such a close distance from one another that the operating medium can flow through them, but the solids cannot. A solid filter of this kind is also referred to as a "rock stopper" and is used to protect the pump.

The operating medium vessel preferably forms the storage volume for storing the operating medium. The operating medium vessel can therefore form the substantially fluid-tight outer shell of the storage volume (hereinafter also referred to as "wall") and demarcates the storage volume with respect to the installation space in the vehicle. In the case of plastic containers, this is referred to as the bladder, for example. In the case of steel containers, the operating medium vessel may, for example, be formed from two metal shells.

In particular, the withdrawal section and the feed section together form the entire operating medium vessel. In other words, the wall of the operating medium vessel is preferably composed of a first part of the wall that demarcates an inner region of the withdrawal section in respect of the surroundings of the operating medium vessel, and a second part of the wall that demarcates an inner region of the feed section in respect of the surroundings of the operating medium vessel. The withdrawal section is preferably higher than the feed section, i.e. in the installed position of the operating medium vessel the withdrawal section may project upwards beyond the feed section.

A filling section for filling the operating medium vessel with the operating medium can be arranged in the withdrawal section, particularly at a higher (vertical) level than the highest vertical point of the operating medium vessel in the feed section in the installed position. When filling the operating medium vessel, particularly with a comparatively small initial filling amount of 5 to 13 liters of operating medium, for example, the operating medium can flow directly into the withdrawal section and directly into the swirl pot. If part of the operating medium flows into the feed section, this part can be conveyed, at least partially, into the operating medium reservoir by means of the first conveying device and subsequently into the swirl pot by means of the second conveying device, assuming a horizontal orientation of the operating medium vessel.

To this end, it has proved advantageous for the first conveying device to be equipped with at least one first suction jet pump (also known as jet pump(s)). Similarly, the second conveying device can also be provided with at least one second suction jet pump (jet pump(s)). In particular, the suction jet pumps in each case can be used to convey the operating medium. Each jet pump can include at least one associated drive line, as well as at least one suction line and/or combined line. In other words, the at least one first suction jet pump may have at least one first drive line, at least one first suction line, and/or at least one first combined line. Accordingly, the at least one second suction jet pump may have at least one second drive line, at least one second suction line, and/or at least one second combined line. Suction jet pumps as such are known to a person skilled in the art. A suction jet pump typically comprises a mixing tube with a cone diverging in the direction of flow. A driving medium flows into this mixing tube and thereby usually draws the operating medium from the suction line with it. A suction jet pump of this kind is comparatively inexpensive, reliable, and requires relatively little space.

The first conveying device, apart from the first drive line(s) thereof, which can extend into the withdrawal section and, in particular, up to the functional unit, is preferably arranged entirely in the feed section. This allows the operating medium to be conveyed from the feed section into the operating medium reservoir without deviating through the withdrawal section. Most preferably, at least part of the second conveying device is situated further from the swirl pot than the operating medium reservoir, allowing the latter to effectively serve as an intermediate store for the operating medium along the flow path to the swirl pot. Most preferably, the operating medium reservoir is arranged between the first conveying device and the second conveying device. In particular, the operating medium reservoir can be located upstream of the second conveying device and/or upstream of the first conveying device in relation to the operating medium flow through the conveying system towards the swirl pot.

Any of the suction jet pumps in the first and/or second conveying device can be configured as either suction or driving pumps. Driving suction jet pumps are characterized by the fact that the suction jet pump itself is located in the region to be pumped from, whereas in the case of suction jet pumps, only the intake point (possibly in a suction unit) is placed in the region to be pumped from, but not the suction jet pump itself.

In a preferred variant, at least one first suction jet pump designed as a driving pump is situated adjacent to the first end of the feed section. An associated first drive line can be connected to the delivery line, directing part of the pressurized operating medium flowing through the delivery line as the first mass flow to the at least one first jet pump. A combined flow from the first mass flow and a second mass flow drawn by means of the first jet pump can then be supplied to the operating medium reservoir via the associated first combined line, in particular without deviating through the withdrawal section.

In another preferred variant, at least one first jet pump designed as a suction pump is part of the first conveying device. This first suction jet pump is preferably arranged in the feed section; it may, in particular, be contained within the operating medium reservoir. A first suction line connected in a fluid-conducting manner to this first jet pump preferably has an end opposite this first suction jet pump, which is preferably arranged adjacent to the first end of the feed section. If this first suction jet pump is provided within the operating medium reservoir, a combined line can be dispensed with. The associated first drive line can be connected to the delivery line as described above, so that part of the pressurized operating medium flowing through the delivery line as the first mass flow is conducted to the at least one first jet pump. A combined flow from the first mass flow and a second mass flow drawn by means of the first suction jet pump via the suction line can then be supplied to the operating medium reservoir.

Another preferred variant provides that the second conveying device comprises at least one second suction jet pump designed as a driving pump, which is preferably arranged in the feed section, particularly in the operating medium reservoir, to optimize space. This second suction jet pump preferably contains an inlet arranged adjacent to the bottom of the operating medium reservoir, through which the operating medium can flow into the second jet pump from the operating medium reservoir. An associated second drive line can, similarly to the variants described above in connection with the first conveying device, be supplied with operating medium from the delivery line. In other words, this second drive line can be connected to the delivery line, directing part of the pressurized operating medium flowing through the delivery line as the first mass flow to the at least one second suction jet pump. A combined flow from the first mass flow and a second mass flow drawn by means of the second suction jet pump can then be supplied to the storage cup via the associated second combined line, in particular beyond the threshold.

In another preferred variant, at least one second suction jet pump designed as a suction pump is part of the second conveying device. This second suction jet pump is preferably arranged in the withdrawal section; it may, in particular, be contained in the functional unit. A second suction line that is connected to this second suction jet pump in a fluid-conducting manner has an end opposite this second suction jet pump that is preferably connected to the operating medium reservoir in a fluid-conducting manner, so that operating medium from the operating medium reservoir can be drawn into the suction line by means of the second jet pump, particularly adjacent to the bottom of the operating medium reservoir. The associated second drive line can in turn be connected to the delivery line, directing part of the pressurized operating medium flowing through the delivery line as the first mass flow to the at least one second suction jet pump. A combined flow from the first mass flow and a second mass flow drawn by means of the second suction jet pump through the second suction line can then be supplied to the storage cup.

If the first conveying device comprises multiple first suction jet pumps, drive lines, suction lines, and/or combined lines, these components can each be configured as an arrangement of the at least one first suction jet pump, first drive line, first suction line, and first combined line described above. Similarly to this, if the second conveying device comprises multiple second suction jet pumps, drive lines, suction lines, and/or combined lines, these components can each be configured as an arrangement of the at least one second suction jet pump, second drive line, second suction line, and second combined line described above. In a particularly preferred variant, all suction jet pumps of the operating medium conveying system are arranged in the operating medium reservoir.

When filling the operating medium vessel or during operation of the vehicle, operating medium that enters the feed section can therefore not only slosh over the threshold into the withdrawal section, but can also be conveyed into the storage cup by means of the operating medium conveying system. Operating medium located in the withdrawal section outside the storage cup can flow into the storage cup when the valve at the inlet is opened and, upon reaching the lowest level from which the conveying device can pump the operating medium in the storage cup, can be pressurized by means of the conveying device and conveyed towards the outlet. Part of this operating medium can be diverted to operate the suction jet pumps, in order to provide efficient emptying of the feed section by means of the operating medium conveying system.

It is preferred that the withdrawal section is higher than the feed section. The height of the withdrawal section in this case can be the maximum extent of the withdrawal section and the operating medium vessel can be perpendicular to the bottom of the operating medium vessel in the withdrawal section. If this part of the bottom is horizontally aligned in the installed position, the height of the withdrawal section and the height of the operating medium vessel correspond to the vertical extent (height) of the withdrawal section. The width of the operating medium vessel can be measured in the main direction of extent of the withdrawal section or perpendicular to a direction in which the feed section extends away from the withdrawal section. A length of the operating medium vessel (or sections thereof) can be measured in the longitudinal direction of the feed section parallel to the bottom of the withdrawal section and/or perpendicular to the main direction of extent of the withdrawal section.

The height of the withdrawal section is preferably at least 1.5 times or at least twice as great as the height of the feed section. The height of the withdrawal section can be at least 20 cm; the height of the feed section can be at most 20 cm or at most 15 cm. The width of the feed section may substantially correspond to the width of the withdrawal section and/or the total width of the operating medium vessel.

This width is preferably between 0.70 m and 1.00 m. The length of the operating medium vessel is preferably between 1.00 m and 1.50 m. The length of the feed section is preferably at least twice as great, preferably at least three times as great, as the length of the withdrawal section. Accordingly, the base area of the feed section is preferably at least twice as great, preferably at least three times as great, as the (horizontal) base area of the withdrawal section.

In particular, the feed section can be longer than the withdrawal section is high. In a particularly preferred variant, the feed section is at least 5 times or at least 8 times as long as the feed section is high. As a result, the feed section is preferably flatter than the withdrawal section but preferably has a greater capacity volume (internal volume) for the operating medium than the withdrawal section. This can be particularly advantageous for the center of gravity and therefore the driving dynamics of the vehicle. The internal volume of the feed section may, in particular, be at least twice as great as the internal volume of the withdrawal section. The feed section preferably has a ratio of base area in square meters to height in meters of between 5:1 and 20:1 or between 7:1 and 15:1. The aforementioned threshold can be at most half as high or at most a quarter as high as the feed section.

In another preferred variant, the withdrawal section contains a sump for the operating medium. The sump can be designed as a depression in the bottom of the withdrawal section. The sump preferably extends over the entire base area of the withdrawal section. In particular, the sump may extend (in the longitudinal direction) from the boundary between the withdrawal section and the feed section to the end of the withdrawal section opposite the feed section. Furthermore, the sump can extend over part of the width of the withdrawal section or over the entire width of the withdrawal section. The sump preferably has a greater volume than the storage cup.

The transition between the connecting section and the sump can be stepped or gradual, wherein the transition preferably has a greater slope than the ramp to favor sloshing in the direction of the sump. Moreover, the sump is preferably directly bounded horizontally by one or more walls of the operating medium vessel. Most preferably, the swirl pot is arranged at least sectionally in the sump. The inlet of the swirl pot and/or the lowest operating medium level from which the functional unit can convey operating medium from the swirl pot by means of the conveying device are preferably arranged in the sump in this case. This can allow the minimum initial filling amount of operating medium required to operate the vehicle as intended to be reduced.

The operating medium is preferably a fuel for a motor vehicle. Similarly, it is conceivable that the technology disclosed here can be used for storing other liquids (e.g. water or an aqueous solution) in a motor vehicle. When an operating medium vessel, operating medium pump, and the like, are referred to in this case, the terms fuel tank and fuel pump are to be equally disclosed. The fuel can be liquid under standard conditions and/or at standard pressure, at least in a temperature range from −25 to +100° C. In particular, the fuel can be gasoline or diesel. The operating medium vessel may be designed accordingly to store the liquid operating medium at standard pressure. In particular, it is provided that the operating medium vessel is not a saddle tank. Instead, the operating medium vessel is preferably designed as a flat tank and/or as a single-chamber tank.

The vehicle proposed here is preferably a motor vehicle and comprises an operating medium vessel detailed above which is mounted on the vehicle in its installed position. The operating medium vessel is preferably oriented such that the feed section is positioned at the front in the longitudinal direction of the vehicle and the withdrawal section is positioned at the rear in the longitudinal direction of the vehicle. In this way, the operating medium located in the container can shift due to its inertia in the direction of the withdrawal section, and therefore into the swirl pot during starting, so that the operating medium level in the swirl pot can rise at the moment of increased operating medium consumption. The operating medium vessel is preferably arranged in the underfloor area of the vehicle, particularly sectionally or completely between a front axle and a rear axle of the vehicle. In the installed position, the operating medium level in the container runs horizontally.

In other words, the technology disclosed here relates to a large-area operating medium vessel (single-chamber tank) with an intermediate store for fuel drawn by at least one suction jet pump. The operating medium vessel also allows fuel to be pumped into a surge tank even in large-area tanks.

Moreover, a quick first fill of the functional unit/tank installation unit at the vehicle plant and/or an improvement in the minimum suction amount can be achieved if the contact area of the swirl pot/tank installation unit is lowered by at least a height difference relative to the bottom of the operating medium vessel in the immediate vicinity of the swirl pot, corresponding to the height of the suction point (lowest operating medium level from which the operating medium can be drawn) of the functional unit/tank installation unit above the contact area. This can also facilitate restarting after refueling with a jerry can. The intermediate store (operating medium reservoir) can be directly attached to the bottom of the operating medium vessel or mounted on feet on the bottom of the operating medium vessel. In one variant, a suction jet pump is integrated in the intermediate store.

At this point, moreover, the operating medium conveying system described in detail above is also disclosed in independent form.

The technology disclosed here will now be explained with reference to the figures.

DETAILED DESCRIPTION OF THE DRAWINGS

Figure 7:
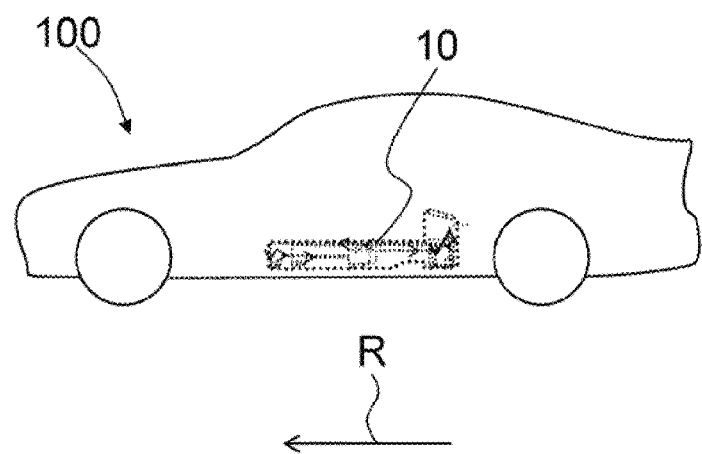
FIG. 7 illustrates a vehicle with the operating medium vessel from FIG. 1 in a side view, wherein the operating medium vessel is in the underfloor area of the vehicle in its installed position.

FIGS. 1 to 4 show an operating medium vessel 10 for a vehicle 100 schematically illustrated in FIG. 7, which is a motor vehicle, for example a passenger vehicle. In this example, the vehicle 100 has a drive unit with an internal combustion engine that can only be operated with an operating medium in the form of fuel, for example. The operating medium vessel 10 is a single-chamber tank provided for storing liquid operating medium; it has an integral design and consists of a withdrawal section 20 and a feed section 30, wherein the feed section 30 is flatter and has a larger base area than the withdrawal section 20.

In this variant, an entire single-piece shell of the operating medium vessel 10 is formed by a part of the shell that defines the withdrawal section 20 and a part of the shell that defines the feed section 30. A bottom 12 of the operating medium vessel 10 is part of this shell and forms the base area of the operating medium vessel 10. A transition/boundary between the feed section 30 and the withdrawal section 20 is open and forms a fluid-conducting connection between the feed section 30 and the withdrawal section 20, wherein the feed section 30 has a connecting section 35 adjacent to the withdrawal section 20.

A swirl pot 22 is arranged in the withdrawal section 20 which is part of a functional unit 24 for withdrawing the operating medium from the withdrawal section 20 and has an inlet 26 with a valve. The valve can be designed as a flap, for example, or a check valve (in particular a mushroom valve). The inlet 26 is formed in the region of the bottom (in this case as an opening in the bottom) of the swirl pot 22 and is arranged adjacent to the bottom 12. The inlet 26 is used to allow liquid operating medium to flow directly from the withdrawal section 20 into the swirl pot 22. To facilitate this, the swirl pot 22 stands on the bottom 12 in a support area of the bottom 12 in such a manner that the bottom 12 and the bottom of the swirl pot are spaced apart from one another at least sectionally, particularly in the region of the inlet 26. The swirl pot 22 may also have one or more additional inlets (feeds) in the bottom 12 or at higher vertical levels in a wall of the swirl pot 22.

The functional unit 24 (also known as the tank installation unit) further comprises at least one conveying device 28 designed as an (active) operating medium pump and an outlet 29. The functional unit 24 is configured to deliver operating medium from the swirl pot 22 by means of the conveying device 28 through at least one delivery line 27 towards the outlet 29. The conveying device 28 can deliver the operating medium in this manner when the level of the operating medium is at least at a predetermined lowest operating medium level 42. The functional unit 20 can be inserted into the withdrawal section 20 through a correspondingly sized, closeable opening 23 in the wall of the withdrawal section 20. A filling section 21 for filling the operating medium vessel with the operating medium is part of a closure for the opening 23 in this case.

Inside the operating medium vessel 10, there is also an operating medium conveying system with an operating medium reservoir 52 arranged in the feed section 30, as well as a first conveying device 54 and a second conveying device 56, which are each connected in a fluid-conducting manner to the operating medium reservoir 52. The first conveying device 54 is configured to deliver operating medium from the feed section 30 from outside the operating medium reservoir 52, in particular from one or more suction units 58, 60, into the operating medium reservoir 52. The second conveying device 56 is configured to deliver operating medium from the operating medium reservoir 52 to the swirl pot 22.

In the variant shown in FIG. 1, the first conveying device 54 contains two first suction jet pumps 62, 64, both arranged in the feed section 30 and configured as driving pumps, as explained in greater detail below. Each first jet pump 62, 64 is connected in a fluid-conducting manner to a first drive line 62a, 64a, and a first combined line 62c, 64c. A separate suction line in each case is not necessary here and therefore is not shown; however, it can be used in addition for the connection between each additional suction unit 58, 60 and the corresponding first jet pump 62, 64. The first drive lines 62a, 64a (see FIGS. 1 and 3) each connect the delivery line 27 to the first suction jet pumps 62, 64, in particular to a connection of the first jet pump 62, 64 in each case for the driving medium, which is pressurized operating medium diverted from the delivery line 27.

After the driving medium has passed through the first suction jet pump 62, 64 in each case, increasing the mass flow of the operating medium to a combined flow, the driving medium, together with the operating medium (so-called suction medium) drawn from the feed section 30 in the region of the first suction jet pump 62, 64, in each case reaches the operating medium reservoir 52 via the respective combined line 62c, 64c. The entry of the combined flow into the operating medium reservoir 52 raises an operating medium level 68 in the operating medium reservoir 52, which is vented via a vent valve 70.

In order to deliver operating medium from the operating medium reservoir 52, the second conveying device 56 contains a drawing second suction jet pump 66 that is arranged in the withdrawal section 20 in this variant. In particular, the second suction jet pump 66 is designed as part of the functional unit 24. A second drive line 66a connects the delivery line 27 to the second jet pump 66 in a fluid-conducting manner, in particular to a connection of the second suction jet pump 66 for the driving medium, which is also pressurized operating medium diverted from the delivery line 27. A second suction line 66b connects an outlet of the operating medium reservoir 52 that is arranged adjacent to, or in the bottom of, the latter, to a second connection of the second jet pump 66 for the suction medium (operating medium supplied to the second suction jet pump 66 via the second suction line 66b). Following the passage of the driving medium from the second drive line 66a through the second suction jet pump 66, drawing operating medium from the operating medium reservoir 52 via the second suction line 66b, the resulting combined flow then flows either directly or via a second combined line (not shown) into the swirl pot 22.

The bottom 12 of the operating medium vessel 10 runs in the support area for the swirl pot 22 and in this variant throughout the withdrawal section 20 substantially along a plane E, which may be horizontally oriented. In the installed position of the operating medium vessel 10 shown in FIG. 3, it is provided that the plane E runs parallel to an operating medium level of the operating medium located in the operating medium vessel 10, particularly when the vehicle is stationary. In the region of the feed section 30 outside the connecting section 35, the bottom 12 runs parallel or coplanar to the plane E. In the connecting section 35, the bottom 12 is provided with a threshold 37. In the feed section 30 outside the connecting section 35, the bottom 12 may be substantially flat, apart from raised portions designed as ribs 36 in the bottom 12. The ribs 36 project into the interior of the operating medium vessel 10 and run in the longitudinal direction of the feed section 30.

Figure 1:
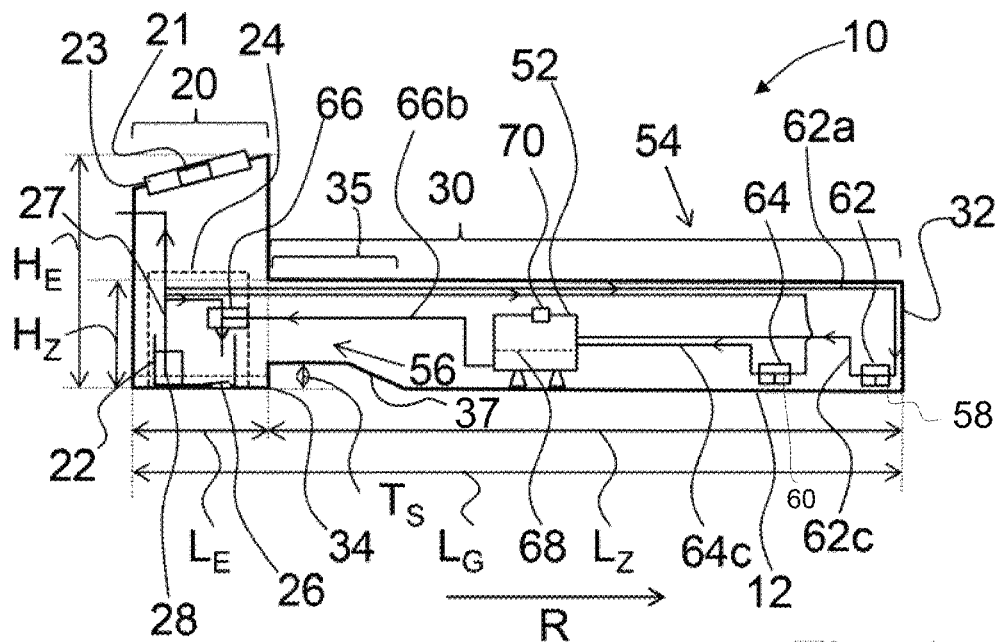
FIG. 1 illustrates a first embodiment of an operating medium vessel for a vehicle in a vertical longitudinal sectional view, wherein the operating medium vessel is located in its installed position.
Figure 2:
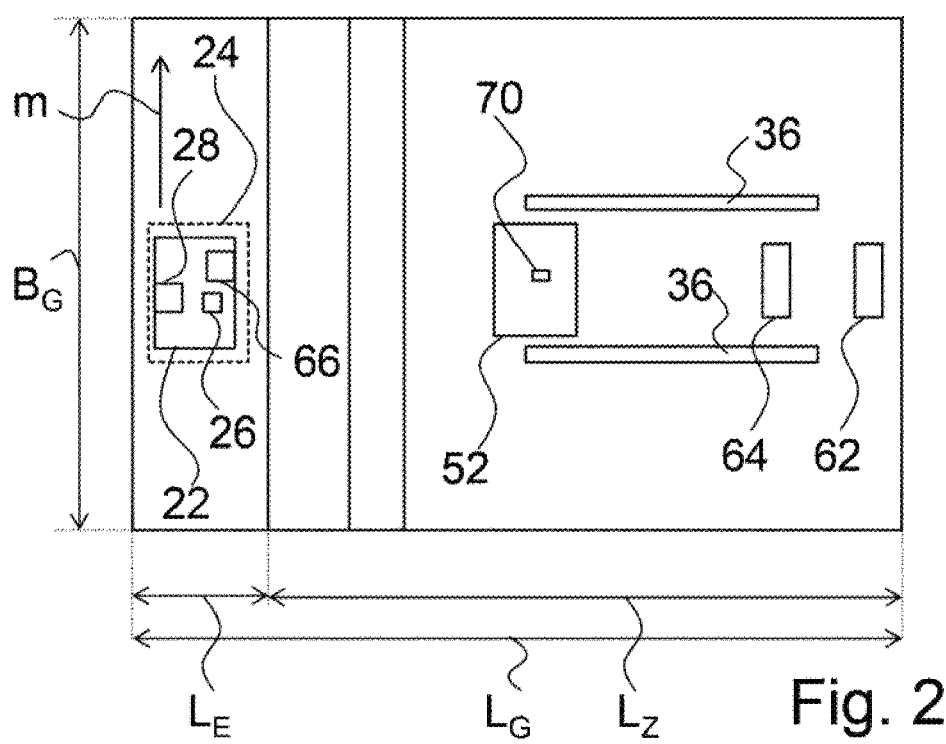
FIG. 2 illustrates the operating medium vessel from FIG. 1 in a horizontal sectional view, wherein lines are omitted for clarity.
Figure 3:
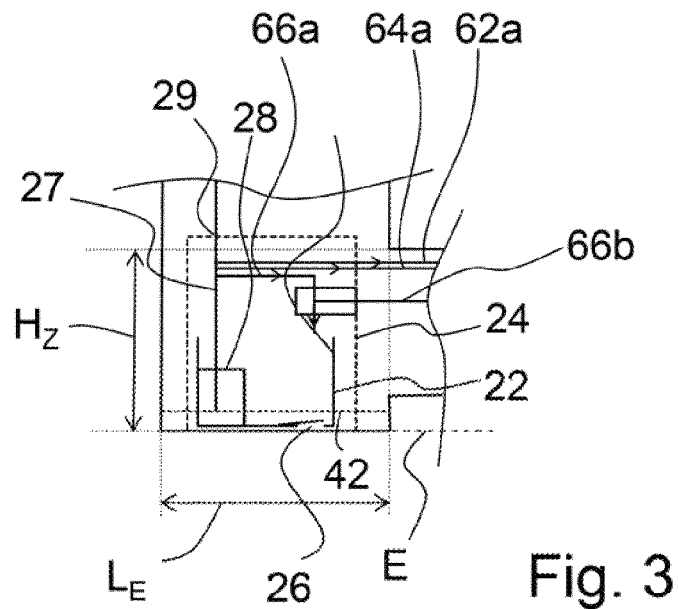
FIG. 3 is a detailed view of the operating medium vessel from FIG. 1 in the region of the swirl pot.
Figure 4:
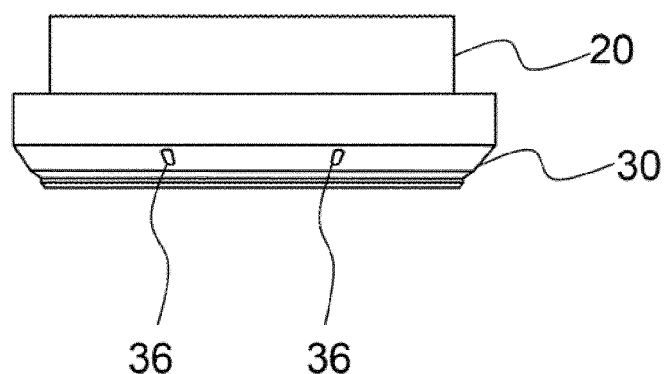
FIG. 4 is a perspective front view of the operating medium vessel from FIG. 1 from obliquely below the horizontal.

The operating medium vessel 10 has a height $H_E$ in the region of the withdrawal section 20 perpendicular to plane E which is at least 1.5 times, preferably at least twice as great as a height $H_z$ of the feed section (in the same direction, see FIG. 1). It can be seen from FIG. 2 that the withdrawal section 20 has a main direction of extent m parallel to the plane E; in this main direction of extent m, the entire operating medium vessel has a width $B_G$. Both the withdrawal section 20 and the feed section 30 have the same width $B_G$. In plane E and perpendicular to the main direction of extent m, the feed section 30 has a length $L_z$ that is between 2 and 5 times as great, in this case particularly at least 2.5 times as great, as a length $L_E$ of the withdrawal section (measured in the same direction).

To allow the operating medium vessel 10 to use a flat installation space, in particular in the underfloor area of the vehicle 100, as efficiently as possible with its feed section 30, the feed section 30 is designed to be flat, in particular flatter than the withdrawal section 20. The length $L_z$ of the feed section 30 is at least 5 times or at least 8 times as great as the height $H_z$ of the feed section 30. The feed section 30 has a ratio of base area in square meters to height in meters of between 5:1 and 20:1, between 7:1 and 15:1, or (preferably) between 9:1 and 11:1. An internal volume of the feed section 30 is preferably at least twice as great as an internal volume of the withdrawal section 20. The total nominal capacity of the operating medium vessel may be between 40 and 150 liters and is 50 liters in this case.

The withdrawal section 20 also comprises a sump 34 for the operating medium, in which a vertically lower part of the swirl pot 22 is arranged. In particular, the sump 34 is designed in such a way that the bottom 12 in the region of the withdrawal section 20 is vertically lower by a depth $T_s$ of the sump 34 than the bottom 12 at an end of the feed section 30 adjacent to the withdrawal section 20. The sump 34 is bounded by the aforementioned threshold. The inlet 26 of the swirl pot 22 and the lowest operating medium level 42, from which the functional unit 24 can deliver the operating medium from the swirl pot 22 by means of the conveying device 28, is located in the sump 34.

Figure 5:
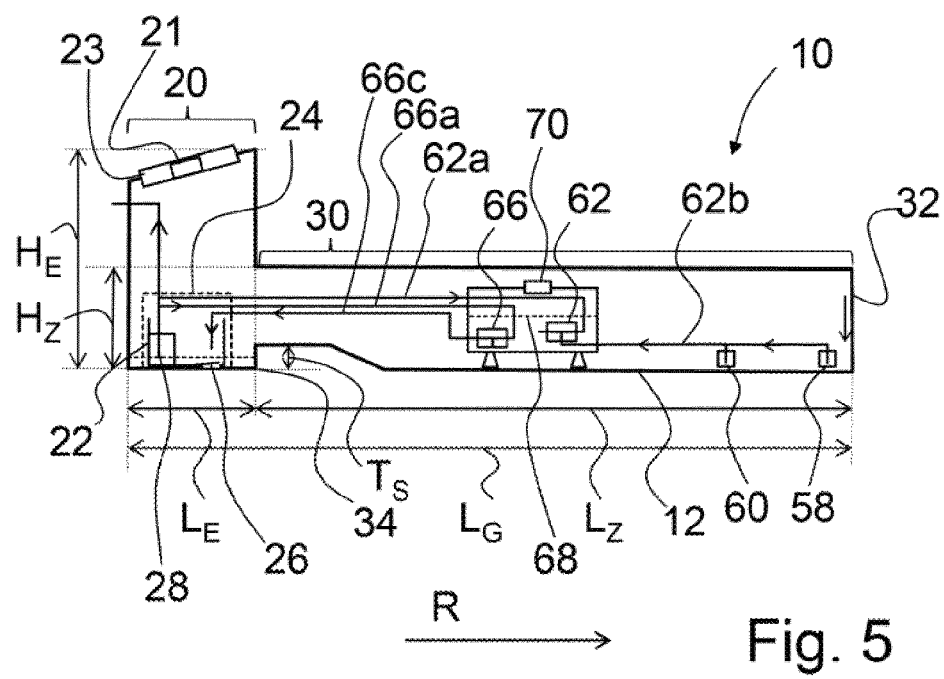
FIG. 5 illustrates a second embodiment of an operating medium vessel for a vehicle in a vertical longitudinal sectional view, wherein the operating medium vessel is in its installed position.
Figure 6:
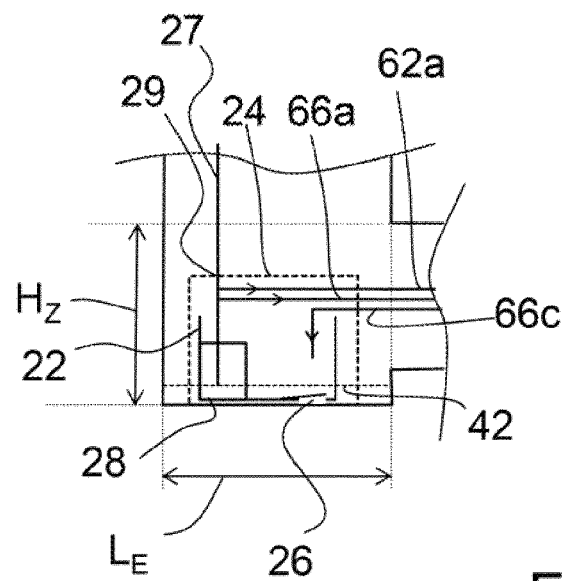
FIG. 6 is a detailed view of the operating medium vessel from FIG. 5 in the region of the swirl pot.

An operating medium vessel 10 shown in FIGS. 5 and 6 differs from the operating medium vessel 10 in FIG. 1 in that the first conveying device 54 has a drawing first suction jet pump 62 instead of two driving first suction jet pumps, and the second conveying device 56 has a driving second suction jet pump 66 instead of a drawing second suction jet pump 66. The first and second suction jet pumps 62, 66 in this case are contained by way of example in the operating medium reservoir 52. Accordingly, the first conveying device 54 contains a suction line 66b instead of the combined line 62c, via which the first suction jet pump 62 is connected to the suction units 58, 60 in a fluid-connecting manner.

The suction units 58, 60 are preferably located on a side of the operating medium reservoir 52 opposite the withdrawal section 20. The combined flow from this first jet pump 62 reaches the operating medium reservoir 52 directly due to the arrangement of the first jet pump 62. The second conveying device 56, on the other hand, comprises a combined line 66c instead of the suction line 66b, wherein the combined line 66c connects the operating medium reservoir 52 to the swirl pot 22 in a fluid-conducting manner. Otherwise, the operating medium vessel 10 according to FIGS. 5 and 6 has all the features of the operating medium vessel 10 according to FIG. 1.

The vehicle 100 shown in FIG. 7 contains an operating medium vessel 10 according to FIG. 1, although the operating medium vessel 10 according to FIG. 5 can be contained instead. The vehicle 100 is located in its horizontal position, and the operating medium vessel 10 is mounted in its installed position on the vehicle 100. The feed section 30 in this case extends away from the withdrawal section 20 in the driving direction R of the vehicle. In other words, the feed section 30 is arranged at the front relative to the vehicle's longitudinal axis, and the withdrawal section 20 is arranged at the rear relative to the vehicle's longitudinal axis. In its installed position, the operating medium vessel 10 is located sectionally or completely in the underfloor area and/or between a front axle and a rear axle of the vehicle 100. In the vehicle's longitudinal direction, the length $L_z$ of the feed section 30 is at least ⅙, preferably at least ⅕ of the total length of the vehicle 100, and in this case less than ⅚ of the total length of the vehicle 100.

For the sake of clarity, the phrase "at least one" has been simplified and partially omitted. If a feature of the technology disclosed here is described in the singular or indefinite form (e.g. the/a(n) operating medium vessel, the/a swirl pot, etc.), its plural form should also be disclosed at the same time (i.e. the at least one operating medium vessel, the at least one swirl pot, etc.). In particular, the number of suction jet pumps and also associated driving, suction, and/or combined lines per conveying device 54, 56 can be any possible combination of one, two, three, four, five, or more, in each case.

The term "substantially" in the context of the technology disclosed here comprises the exact property or exact value and any deviations that are insignificant for the function of the property/value (e.g. due to manufacturing tolerances).

The foregoing description of the present invention is intended for illustrative purposes only and not for the purpose of limiting the invention. Various changes and modifications are possible within the scope of the invention and its equivalents without departing from the scope of the invention.

The invention claimed is:

1. An operating medium vessel for a vehicle, wherein the operating medium vessel is provided for storing liquid operating media, the operating medium vessel comprising:
   a withdrawal section with a swirl pot arranged therein;
   a feed section connected in a fluid-conducting manner to the withdrawal section and adjacent to the withdrawal section; and an operating medium conveying system with an operating medium reservoir arranged in the feed section, a first conveying device, and a second conveying device, wherein the first and the second conveying devices are each connected to the operating medium reservoir in a fluid-conducting manner, the first conveying device is configured to convey operating medium from the feed section from outside the operating medium reservoir into the operating medium reservoir, the second conveying device is configured to convey operating medium from the operating medium reservoir into the swirl pot, an internal volume of the feed section is at least twice as great as an internal volume of the withdrawal section, the feed section is vertically at most half as high in an installed position of the operating medium vessel as the withdrawal section, the feed section has a ratio of base area in square meters to height in meters of between 5:1 and 20:1, the withdrawal section has a main direction of extent (m) and a horizontal length ($L_z$) of the feed section perpendicular to the main direction of extent (m) in the installed position of the operating medium vessel is at least 5 times as great as a vertical height (Hz) of the feed section, and a total nominal capacity of the operating medium vessel is between 40 and 150 liters.

2. The operating medium vessel according to claim 1, wherein the second conveying device is configured with one or more second suction jet pumps and, per each second suction jet pump, a second drive line in each case, wherein the second suction jet pump(s) is/are located in the feed section.

3. The operating medium vessel according to claim 2, wherein the first conveying device is configured with one or more first suction jet pumps and, per each first suction jet pump, a first drive line in each case, wherein the first suction jet pump(s) is/are located in the feed section.

4. The operating medium vessel according to claim 3, wherein one or more of the first or the second suction jet pumps are arranged in the operating medium reservoir.

5. The operating medium vessel according to claim 1, wherein the feed section has a connecting section via which the feed section is connected to the withdrawal section in a fluid-conducting manner, a bottom of the operating medium vessel in the connecting section has a threshold, and the second conveying device is configured to convey operating medium out of the operating medium reservoir beyond the threshold.

6. The operating medium vessel according to claim 1, wherein a bottom of the operating medium vessel at a first end of the feed section, which is opposite the withdrawal section and where the operating medium vessel ends, is arranged vertically at a lower level in the installed position of the operating medium vessel than at a second end adjacent to the withdrawal section.

7. The operating medium vessel according to claim 1, wherein a bottom of the operating medium vessel is provided with one or more ribs in the feed section, which ribs project into the interior of the operating medium vessel.

8. The operating medium vessel according to claim 1, wherein the swirl pot is part of a functional unit for withdrawing the operating medium from the withdrawal section, which functional unit also has a conveying device and a delivery line, and the functional unit is configured to convey operating medium from the swirl pot via the conveying device through the delivery line out of the functional unit.

9. The operating medium vessel according to claim 8, wherein the withdrawal section is provided with a sump for the operating medium, in which the swirl pot is arranged at least sectionally, and a deepest operating medium level, from which the functional unit can convey operating medium from the swirl pot via the conveying device through the delivery line, is arranged in the sump.

10. The operating medium vessel according to claim 8, wherein the first and/or the second conveying device is/are connected to the delivery line in a fluid-conducting manner.

11. The operating medium vessel according to claim 1, wherein one or more of:

the operating medium is a fuel for a motor vehicle, the operating medium vessel is a fuel tank or a fuel flat tank, or the operating medium vessel is a single-chamber tank.

12. A vehicle, comprising:

the operating medium vessel according to claim 1, and a floor, wherein a flat installation space is disposed under the floor, wherein the operating medium vessel is disposed in the flat installation space that is disposed under the floor.

* * * * *